(12) United States Patent
Park (10) Patent No.: US 10,773,712 B2
(45) Date of Patent: Sep. 15, 2020

(54) HYBRID VEHICLE AND METHOD OF CONTROLLING ENGINE THEREFOR

(71) Applicants: HYUNDAI MOTOR COMPANY, Seoul (KR); KIA MOTORS CORPORATION, Seoul (KR)

(72) Inventor: Joon Young Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 398 days.

(21) Appl. No.: 15/857,339

(22) Filed: Dec. 28, 2017

(65) Prior Publication Data

US 2019/0100193 A1  Apr. 4, 2019

(30) Foreign Application Priority Data

Sep. 29, 2017 (KR) .................. 10-2017-0127408

(51) Int. Cl.
| | |
|---|---|
| *B60W 20/40* | (2016.01) |
| *B60K 6/22* | (2007.10) |
| *B60W 30/18* | (2012.01) |
| *F02N 11/08* | (2006.01) |
| *B60K 6/44* | (2007.10) |
| *B60K 6/26* | (2007.10) |

(52) U.S. Cl.
CPC .............. *B60W 20/40* (2013.01); *B60K 6/22* (2013.01); *B60W 30/18018* (2013.01); *F02N 11/0837* (2013.01); *B60K 2006/262* (2013.01); *F02N 11/0818* (2013.01); *F02N 2200/061* (2013.01); *F02N 2200/125* (2013.01)

(58) Field of Classification Search
CPC . B60K 6/54; B60K 8/00; B60K 10/06; B60K 10/02; B60K 20/00; B60K 20/11; F02D 17/00; F02D 29/06; F02N 15/00; B60W 20/40
USPC .......................................................... 701/22
See application file for complete search history.

(56) References Cited

U.S. PATENT DOCUMENTS

| | | | |
|---|---|---|---|
| 9,069,653 B2 | 6/2015 | Be et al. | |
| 9,074,572 B2 | 7/2015 | Albertson | |
| 9,151,263 B2 | 10/2015 | Hrovat et al. | |
| 2009/0299549 A1* | 12/2009 | Albertson | B60W 10/06 701/2 |
| 2010/0332064 A1* | 12/2010 | Rieling | B60W 20/00 701/22 |

(Continued)

FOREIGN PATENT DOCUMENTS

| | | |
|---|---|---|
| JP | 2000-205000 A | 7/2000 |
| JP | 2001-107770 A | 4/2001 |
| KR | 10-1738818 B1 | 5/2017 |

*Primary Examiner* — Tan Q Nguyen
(74) *Attorney, Agent, or Firm* — Morgan, Lewis & Bockius LLP (57) ABSTRACT

An engine operation control method of a hybrid vehicle for minimizing non-driving fuel consumption upon stopping includes steps of receiving traffic information including signal information of a front traffic signal lamp, determining whether a proceeding-signal change condition is satisfied based on the received signal information upon stopping, setting any one of different engine operation conditions according to the result of determination, and comparing the set engine operation condition with a current vehicle state to determine whether an engine operates or not.

18 Claims, 5 Drawing Sheets

(56) References Cited

U.S. PATENT DOCUMENTS

| | | |
|---|---|---|
| 2012/0022718 A1 | 1/2012 | Neelakantan |
| 2013/0158838 A1 | 6/2013 | Yorke et al. |
| 2013/0297124 A1* | 11/2013 | Be .................... B60W 10/08 |
| | | 701/22 |
| 2014/0041606 A1* | 2/2014 | Kobayashi .......... F02D 13/0219 |
| | | 123/90.15 |
| 2015/0367830 A1* | 12/2015 | Soliman ................ F02D 29/02 |
| | | 701/22 |
| 2016/0137185 A1* | 5/2016 | Morisaki ................ B60K 6/442 |
| | | 701/22 |

* cited by examiner

FIG. 1

--RELATED ART--

FIG. 2

--RELATED ART--

FIG. 3

--RELATED ART--

HYBRID VEHICLE AND METHOD OF CONTROLLING ENGINE THEREFOR

This application is based on and claims the benefit of priority to Korean Patent Application No. 10-2017-0127408, filed on Sep. 29, 2017 with the Korean Intellectual Property Office, which is hereby incorporated by reference as if fully set forth herein.

TECHNICAL FIELD

The present disclosure relates to a hybrid vehicle and a method of controlling an engine therefor, and more particularly, to a hybrid vehicle capable of minimizing non-driving fuel consumption upon stopping and a method of controlling an engine therefor.

BACKGROUND

Recently, with continued demand for improvement of fuel efficiency of vehicles and stringent regulations on emissions from vehicles in many countries, demand for eco-friendly vehicles has increased. As a practical representative thereof, hybrid electric vehicles (HEVs) and plug-in hybrid electric vehicles (PHEVs) have been developed.

A hybrid vehicle runs using two power sources including an engine and a motor. For a harmonious operation of the engine and the motor, optimal output and torque may be generated. Specifically, in the case of a hybrid vehicle equipped with a parallel-type or TMED-type (Transmission-Mounted-Electric-Device-type) hybrid system, in which an electric motor and an engine clutch (EC) are installed between an engine and a transmission, an output of the engine and an output of the motor may be transmitted to a drive shaft simultaneously.

Typically, in an initial stage of acceleration, the hybrid vehicle runs using electrical energy (i.e. an EV mode). However, there is a limitation in providing enough power requested by a driver using only electrical energy, and there is thus a need to use an engine as a main power source (i.e. an HEV mode) at certain moments. At such times, when the difference between the number of revolutions per minute of the motor and the number of revolutions per minute of the engine is within a predetermined range, an engine clutch is engaged such that the hybrid vehicle operates as the motor and the engine rotate together.

However, the engine may not be used as the main power source even in the HEV mode. For example, in a parallel mode of the HEV mode, the power of the engine functions as driving force. On the other hand, in a series HEV mode, the engine is driven with low load and thus the driving force of the engine is used to generate electricity. This will be described with reference to FIG. 1.

Figure 1:
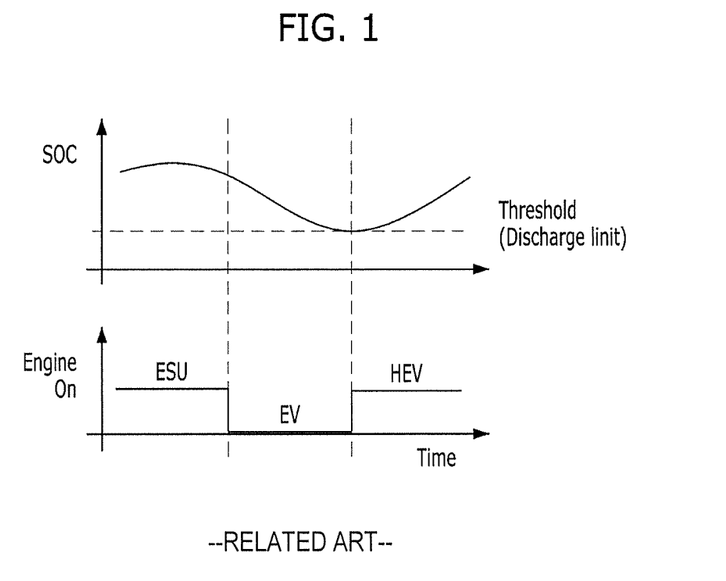
FIG. 1 is an illustrative view showing change to a series HEV mode for generation of electricity in a general hybrid vehicle.

FIG. 1 is an illustrative view showing change to a series HEV mode for generation of electricity in a general hybrid vehicle.

Referring to FIG. 1, while the hybrid vehicle is driven in an EV mode, when a state-of-charge (SOC) value becomes equal to or less than a predetermined value (discharge limit), an engine operates to perform charging with power of the engine. At this time, when the vehicle is stopping, since the power of the engine is not used for driving and the operating point of the engine is low, non-driving fuel loss may further increase.

Problems occurring due to such an engine operating point will be described with reference to FIG. 2.

Figure 2:
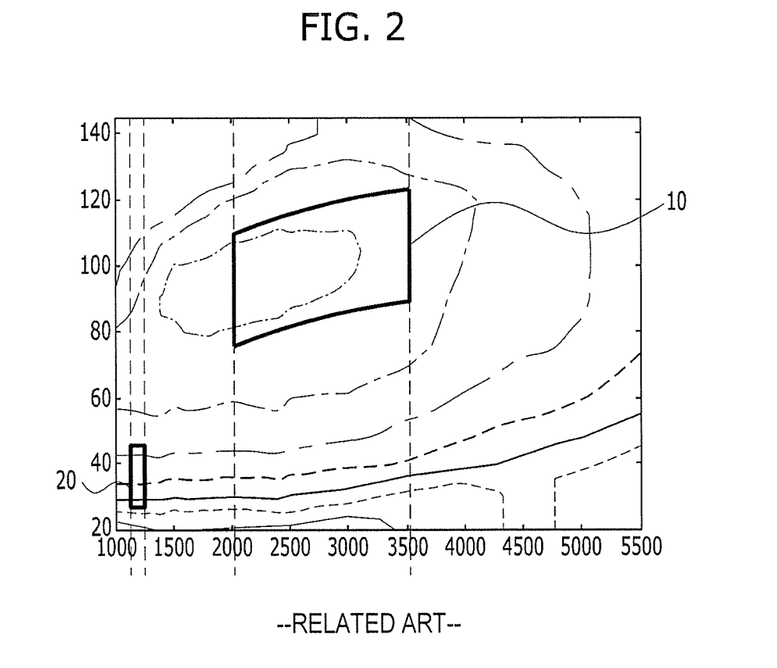
FIG. 2 is an illustrative view showing a relationship between an operating point and efficiency according to the HEV mode of a general hybrid vehicle.

FIG. 2 is an illustrative view showing a relationship between an operating point and efficiency according to the HEV mode of a general hybrid vehicle.

FIG. 2 shows a brake specific fuel consumption graph (BSFC) representing engine efficiency, wherein a horizontal axis of the graph indicates an engine RPM and a vertical axis of the graph indicates a vehicle speed. Efficiency gradually increases toward the center of a circular ISO efficiency curve.

As shown in the figure, a parallel driving region 10 is set in a relatively high efficiency region. In contrast, a series engine driving region 20 is generally set in a low RPM region 1100 to 1300 in consideration of vibration, noise and the output of a motor (e.g., hybrid starter generator (HSG)) which will generate electricity.

Meanwhile, in recently released vehicles, a full automatic temperature controller (FATC) is responsible for performing temperature control. In hybrid vehicles, as necessary, the FATC performs control to heat indoor air using engine coolant heated by heat of the engine. More specifically, when a positive temperature coefficient (PTC) heater is not mounted in a hybrid vehicle or when a PTC heater having low capacity is mounted, the FATC may determine that engine coolant is utilized. At this time, the FATC requests operation of the engine from a hybrid control unit (HCU), when the temperature of engine coolant is less than that of water necessary for heating.

Then, the HCU operates the engine and selects any one of the parallel mode and the series mode depending on situations. However, as described above with reference to FIG. 2, since the parallel mode is better than the series mode in terms of engine efficiency, when the parallel mode is possible (when a vehicle runs at a predetermined speed or more), the parallel mode may be preferentially selected.

However, when a short stop occurs in the parallel mode and the driving mode is changed to the series mode based on the operating point of the engine during such a short stop time, an inefficient control result is obtained. This will be described with reference to FIG. 3.

Figure 3:
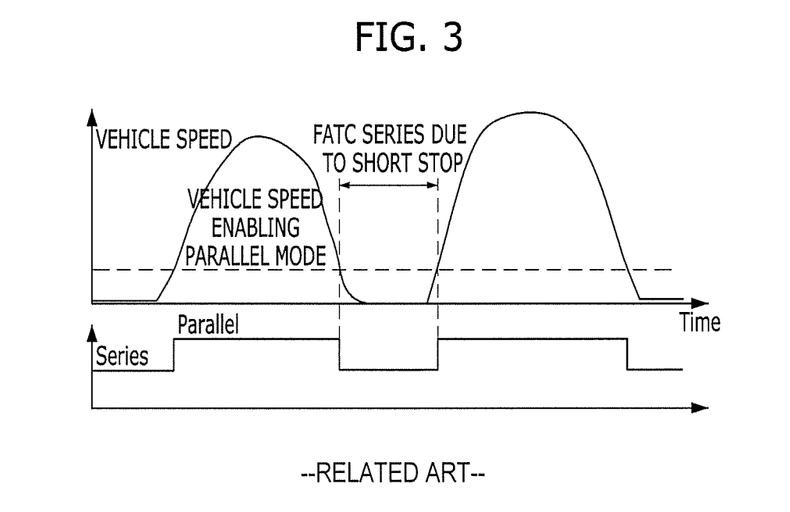
FIG. 3 is an illustrative view showing problems occurring due to HEV mode switching control based on a vehicle speed in a general hybrid vehicle.

FIG. 3 is an illustrative view showing problems occurring due to HEV mode change control based on a vehicle speed in a general hybrid vehicle.

FIG. 3 shows two graphs: an upper graph and a lower graph. Horizontal axes of the two graphs indicate time, a vertical axis of the upper graph indicates vehicle speed, and a vertical axis of the lower graph indicates driving mode of a hybrid powertrain. That is, in the lower graph, a lowest point of the vertical axis indicates an EV mode, a middle point thereof indicates an HEV mode and a highest point thereof indicates a parallel HEV mode.

Referring to FIG. 3, as the vehicle speed reaches to a value enabling to enter the parallel mode after the vehicle departs from a state of stopping in the series mode, the driving mode of the vehicle may be changed to the parallel mode. Even when the vehicle stops for a relatively short period of time due to, for example, traffic signals while being driven in the parallel mode, if the vehicle speed enabling to enter the parallel mode is not satisfied due to the stop, the driving mode of the vehicle is temporarily changed to the series mode. As a result, the engine operates at a low-efficiency operating point during such a short period of stop time and coolant temperature increase is insignificant due to low engine output.

SUMMARY

Accordingly, the present disclosure is directed to a hybrid vehicle and a method of controlling an engine therefor that substantially obviate one or more problems due to limitations and disadvantages of the related art.

An object of the present disclosure is to provide a method of efficiently controlling operation of an engine in a hybrid vehicle and a vehicle for performing the same.

Another object of the present disclosure is to provide an engine control method capable of minimizing non-driving fuel loss and a vehicle for performing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an engine operation control method of a hybrid vehicle includes steps of receiving, by a first controller, traffic information including signal information of a front traffic signal lamp, determining, by a second controller, whether a proceeding-signal change condition is satisfied based on the received signal information upon stopping, setting, by the second controller, any one of different engine operation conditions according to the result of determination, and comparing, by the second controller, the set engine operation condition with a current vehicle state to determine whether an engine operates or not.

In another aspect of the present disclosure, a hybrid vehicle includes a first controller for receiving traffic information including signal information of a front traffic signal lamp and a second controller for determining whether a proceeding-signal change condition is satisfied based on the received signal information upon stopping, setting any one of different engine operation conditions according to a result of determination whether the proceeding-signal change condition is satisfied, and comparing the set engine operation condition with a current vehicle state to determine whether an engine operates or not.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present disclosure, examples of which are illustrated in the accompanying drawings. However, it will be understood that the present disclosure should not be limited to the embodiments and may be modified in various ways. In the drawings, to clearly and briefly explain the present disclosure, illustration of elements having no connection with the description is omitted, and the same or extremely similar elements are designated by the same reference numerals throughout the specification.

In the entire specification, when an element is referred to as "including" another element, the element should not be understood as excluding other elements so long as there is no special conflicting description, and the element may include at least one other element. Wherever possible, the same reference numbers will be used throughout the drawings to refer to the same or like parts.

Prior to an engine control method according to an embodiment of the present disclosure, the structure of a hybrid vehicle, to which the embodiments of the present disclosure are applicable, will be described.

Figure 4:
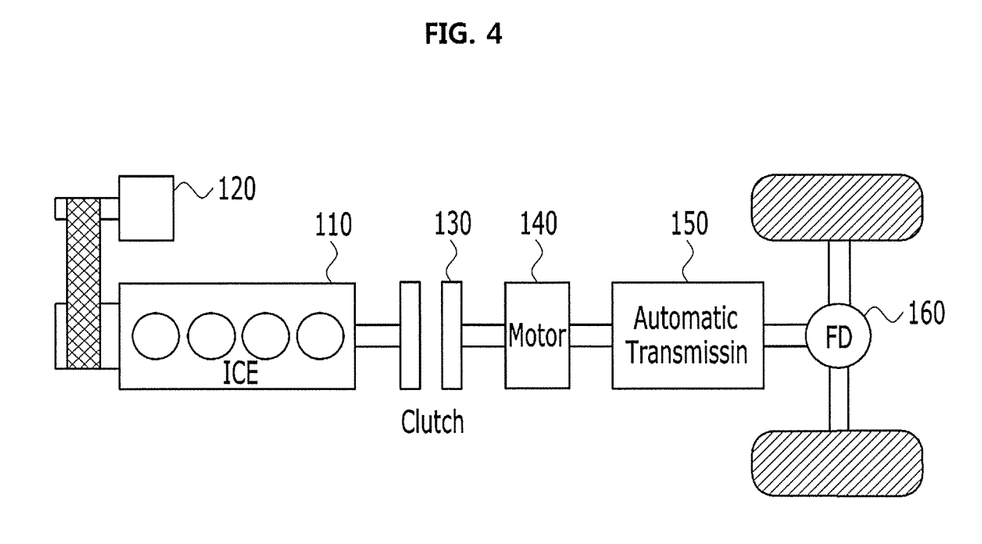
FIG. 4 is an illustrative view showing an exemplary structure of a powertrain of a hybrid vehicle, to which embodiments of the present disclosure are applicable.

FIG. 4 is an illustrative view showing an exemplary structure of a powertrain of a hybrid vehicle, to which the embodiments of the present disclosure are applicable.

Referring to FIG. 4, a powertrain of a hybrid vehicle employing a parallel type hybrid system, in which an electric motor (or a driving motor) 140 and an engine clutch (EC) 130 are installed between an internal combustion engine (ICE) 110 and a transmission 150 is shown.

When a driver presses an accelerator after starting such a vehicle, the motor 140 is first driven using power of a battery in a state in which the engine clutch 130 is opened and power of the motor is transferred to wheels through the transmission 150 and a final drive (FD) 160 (that is, an EV mode). When larger driving force is needed as the vehicle is gradually accelerated, an auxiliary motor (or a starter/generator motor) 120 may operate to drive the engine 110.

Then, when the rotation speed of the engine 110 becomes equal to that of the motor 140, the engine clutch 130 is engaged such that the vehicle is driven using the engine 110 and the motor 140 or using only the engine 110 (that is, transition from the EV mode to an HEV mode). When a predetermined engine off condition such as vehicle deceleration is satisfied, the engine clutch 130 is opened and the engine 110 is stopped (that is, transition from the HEV mode to the EV mode). In addition, in the hybrid vehicle, upon braking, the driving force of the wheels may be converted into electric energy to charge a battery, which is referred to as braking energy regeneration or regenerative braking.

Since the starter/generator motor 120 functions as a starter motor when the engine starts and functions as a generator after starting or upon collecting rotational energy of the engine upon turning off starting, the starter/generator motor may be referred to as a hybrid starter generator (HSG) or may be an axillary motor.

Figure 5:
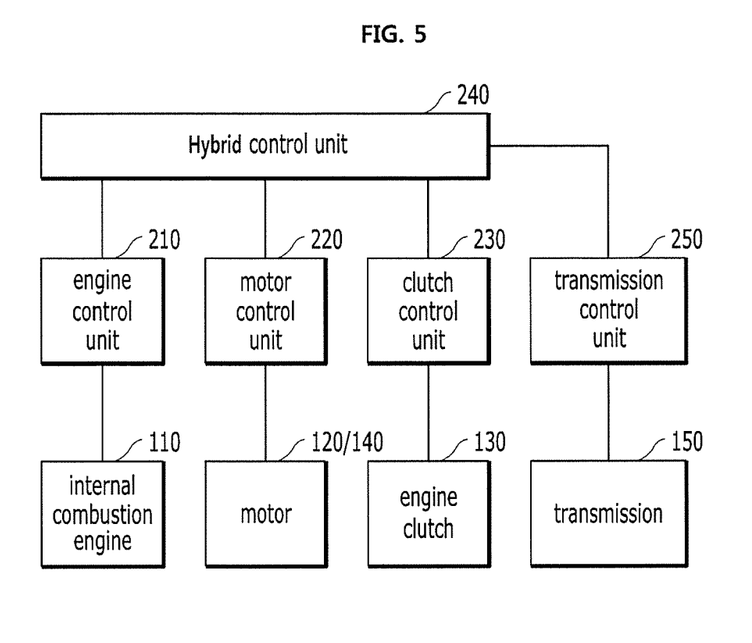
FIG. 5 is a block diagram showing an example of a control system of a hybrid vehicle, to which embodiments of the present disclosure are applicable.

A mutual relation between control units in the vehicle, to which the above-described powertrain is applied, is shown in FIG. 5.

FIG. 5 is a block diagram showing an example of a control system of a hybrid vehicle, to which embodiments of the present disclosure are applicable.

Referring to FIG. 5, in the hybrid vehicle, the internal combustion engine 110 may be controlled by an engine control unit 210. The torques of the starter/generator motor 120 and the electric motor 140 may be controlled by a motor control unit (MCU) 220. The engine clutch 130 may be controlled by a clutch control unit 230. Here, the engine control unit 210 is also referred to as an engine management system (EMS). In addition, the transmission 150 is controlled by a transmission control unit 250. In some cases, the control unit of the starter/generator motor 120 and the control unit of the electric motor 140 may be separately provided.

Each control unit may be connected to a hybrid controller unit (HCU) 240 for controlling a mode control process as a top-level control unit to provide the HCU 240 with information necessary for driving mode change, information necessary for engine clutch control upon gear shifting and/or information necessary for engine stop control or to perform operation according to a control signal, under control of the HCU 240.

The HCU 240 is an electric circuitry that executes instructions of software which thereby performs various functions described hereinafter.

More specifically, the HCU 240 determines whether the mode is changed according to the driving state of the vehicle. For example, the HCU determines a point of time when the engine clutch 130 is opened, and performs hydraulic control (in the case of a wet-type EC) or torque capacity control (in the case of a dry-type EC) when the engine clutch is opened. In addition, the HCU 240 may determine the state of the EC (lock-up, slip, open, etc.) and control a fuel injection stop time of the engine 110. In addition, the HCU may transmit a torque command for controlling the torque of the starter/generator motor 120 to the motor control unit 220 to perform engine rotational energy collection control, for engine stop control. In addition, the HCU 240 may control a low-level control unit for determining and changing mode change conditions upon adaptive mode change control according to the below-described embodiments of the present disclosure.

Of course, it will be apparent to those skilled in the art that connection between the above-described control units and the functions of the control units are exemplary and the present disclosure is not limited thereto. For example, the function of the HCU 240 may be performed by any one of the other control units or may be divided into and performed by two or more of the other controllers. In addition, although a TMED parallel-type hybrid vehicle is described in FIGS. 4 and 5, this is merely exemplary and the embodiments of the present disclosure are not limited by the form of the hybrid vehicle. That is, the embodiments of the present disclosure are applicable to any type of hybrid vehicle wherein an engine operation time is efficiently controlled.

Hereinafter, a more efficient engine control method according to an embodiment of the present disclosure will be described based on the above-described structure of the vehicle.

In one embodiment of the present disclosure, control of an engine operation time using traffic signal information in order to prevent unnecessary non-driving fuel loss upon stopping is proposed.

According to an aspect of the present disclosure, the traffic signal information may include information on a time remaining until a front traffic signal is changed from a stop signal to a proceeding signal (that is, green light).

In addition, according to an aspect of the present embodiment, in order to utilize the traffic signal information, a process of determining whether a current stop situation occurs due to a traffic signal may be included.

In addition, according to an aspect of the present embodiment, if the traffic signal information indicates that the front traffic signal is changed from the stop signal to the proceeding signal within a predetermined time, engine operation may be delayed for the predetermined time. Even when the front traffic signal is changed to the proceeding signal within the predetermined time, if the SOC or the coolant temperature is less than each lower limit, the engine may immediately operate.

In the below description, for convenience, assume that the proceeding signal is referred to as a green light and the stop signal is referred to as a red light. However, this is merely exemplary and the proceeding signal may include a left-turn signal, a right-turn enabled signal and a U-turn signal (e.g., a U-turn signal or a pedestrian green light at a crosswalk) in addition to the green light, and the stop signal may include a yellow light, a left-turn signal, a right-turn disabled signal and "No U-turn" signal, in addition to the red light.

The engine operation control method according to the present embodiment will be described with reference to FIG. 6.

Figure 6:
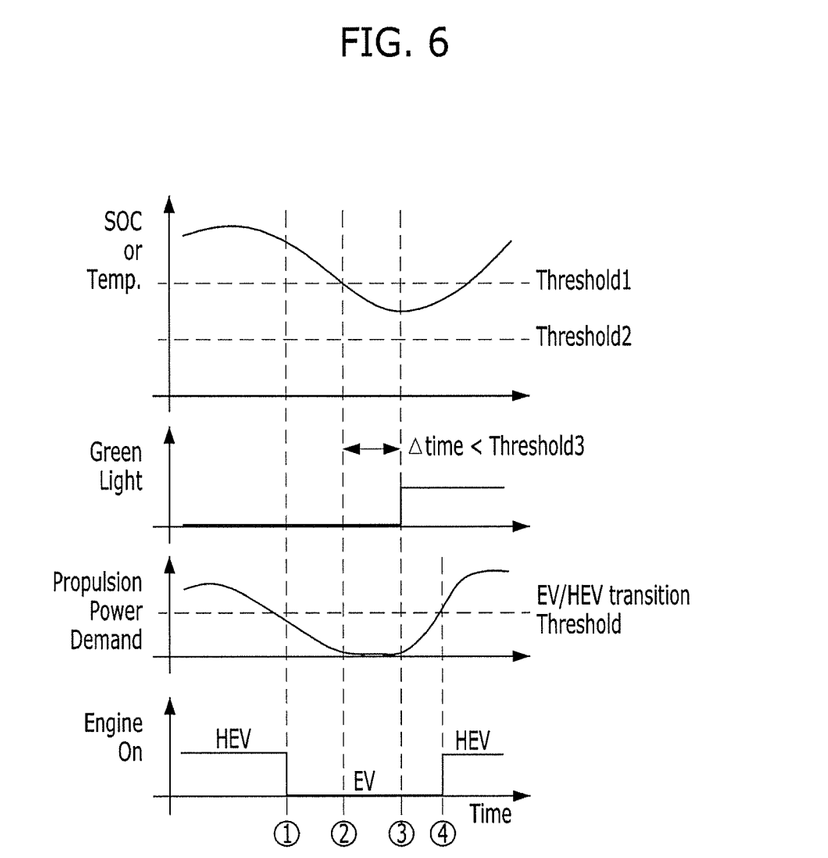
FIG. 6 is an illustrative view showing exemplary forms of signals in an engine operation control method according to an embodiment of the present disclosure.

FIG. 6 is an illustrative view showing exemplary forms of signals in an engine operation control method according to an embodiment of the present disclosure.

FIG. 6 shows four graphs, in which vertical axes respectively denote the SOC or the coolant temperature, whether the green light of the front traffic signal is turned on, required power and whether the engine operates, from top to bottom, and horizontal axes indicate a time commonly applied to the four graphs. In an uppermost graph showing the SOC or the coolant temperature, two different thresholds Threshold1 and Threshold2 are prepared. When the SOC or the coolant temperature becomes lower than any one of the thresholds to be applied, this may mean that the engine operates.

Specifically, in the case of the SOC, Threshold1 may indicate an SOC in which power consumed to start the engine and power used for an auxiliary load is capable of being stably supplied, and Threshold2 may indicate a value in a state in which power is not smoothly supplied due to a voltage drop upon utilizing power to start the engine or utilizing power for an auxiliary load.

In addition, in the case of the temperature, Threshold1 may be set to a temperature for disabling a passenger to sense a temperature change and Threshold2 may be set to a temperature for enabling a passenger to sense a temperature change and to feel slightly uncomfortable. Of course, such setting conditions are merely exemplary. It will be apparent to those skilled in the art that each threshold set per SOC or temperature may be set according to various criteria.

The currently applied threshold (that is, the engine operation condition) may be determined according to a time Δtime remaining until the green light of the traffic signal is turned on. For example, if the time Δtime remaining until the green light of the traffic signal is turned on is less than a reference value Threshold3, a low threshold Threshold2 becomes an engine operation condition, and, otherwise, a high threshold Threshold1 becomes an engine operation condition. That is, when the green light of the traffic signal is immediately turned on, a condition disabling operation of the engine is applied to substantially delay engine operation. Of course, when the vehicle still stops even when the traffic signal is changed, the engine may operate by the low threshold to prevent the SOC or the coolant temperature from being excessively decreased.

Hereinafter, in FIG. 6, for convenience, the uppermost graph will be described based on the SOC.

Referring to FIG. 6, the hybrid vehicle according to the present embodiment is driven in the HEV mode until a time ①. However, since the front traffic signal is a red light, the vehicle is gradually decelerated and thus the requested torque is decreased to an HEV/EV mode change criterion or less. Therefore, the mode is changed to the EV mode after the time ①.

As the speed of the vehicle is continuously decreased, the requested torque converges on 0 at a time ② and thus the vehicle substantially stops. At this time, since the time Δtime remaining until the green light of the traffic signal is turned on (that is a time ③) is less than the reference value Threshold3, the lower threshold Threshold2 of the thresholds for the SOC becomes the engine operation condition. Since the SOC is maintained at the low threshold Threshold2 or more until the time ③ when the traffic signal is changed to the green light, the engine does not operate.

As the green light of the traffic signal is turned on, the driver accelerates the vehicle. When the requested power exceeds the HEV/EV mode change reference criterion at a time ④, engine operation and HEV mode change may be performed.

In the above description, the high threshold Threshold1 may correspond to the engine operation condition according to the SOC or the coolant temperature in general control, without being limited thereto. In addition, the low threshold Threshold2 may be set in consideration of a lowest SOC for protecting the battery/system and a difference between an indoor temperature and a set temperature, which is capable of enabling the driver to feel uncomfortable. In addition, the two thresholds may be separately set with respect to the SOC and the coolant temperature. When any one of the SOC and the coolant temperature becomes equal to or less than the threshold (that is, the engine operation condition) applied in the current situation, the engine may immediately operate.

Figure 7:
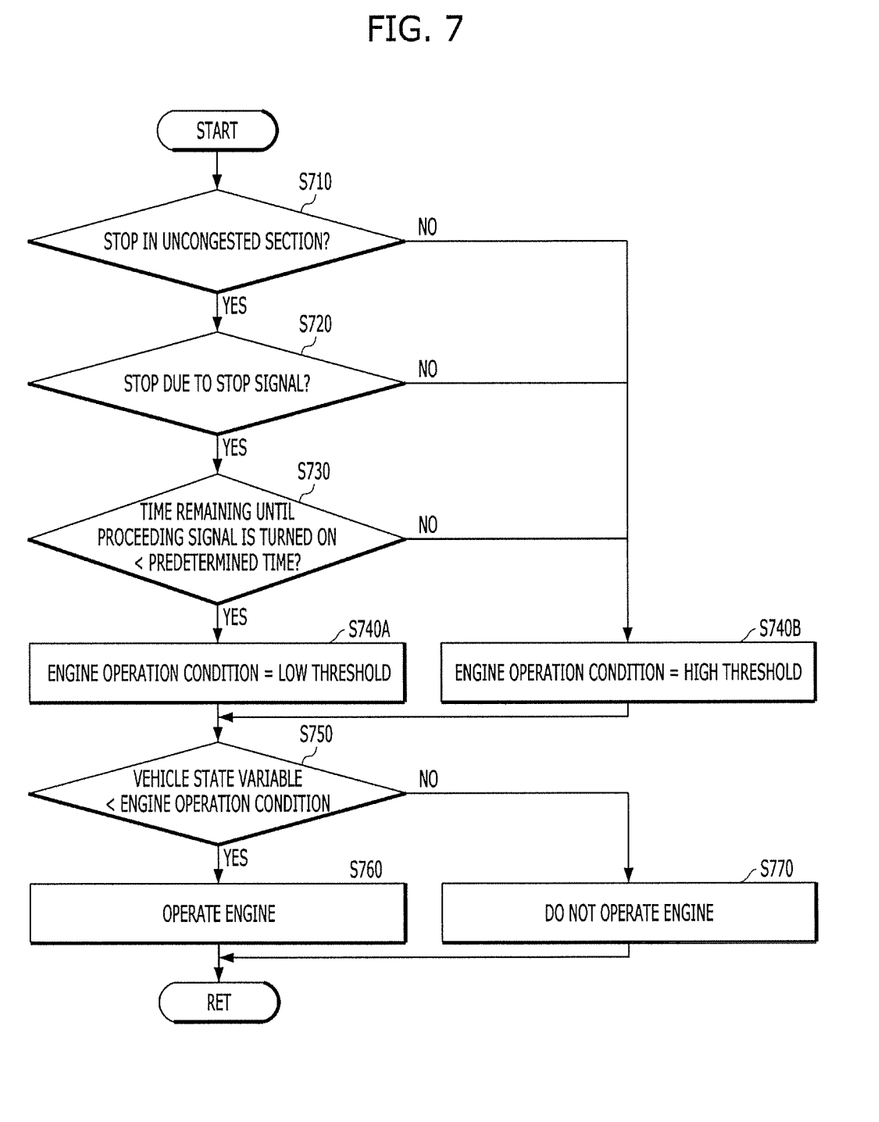
FIG. 7 is a flowchart illustrating an example of an engine operation control process of a hybrid vehicle according to an embodiment of the present disclosure.

The flowchart illustrating the engine operation control method according to the present embodiment is shown in FIG. 7.

FIG. 7 is a flowchart illustrating an example of an engine operation control process of a hybrid vehicle according to an embodiment of the present disclosure.

In FIG. 7, it is assumed that the vehicle wirelessly receives traffic information and the traffic information includes at least one of a signal change period of a front traffic signal or a time when a green light is turned on. The traffic information may further include a green-light duration, information on a distance to a front traffic signal lamp, a per-section congestion degree and a per-section average speed. Although it is assumed that the traffic signal is received through an audio/video/navigation (AVN) system, this is merely exemplary and any controller/system including a communicating device implemented with various electronic circuits to transmit and receive signals via wireless or landline connections may be used as long as wireless communication with a device for providing the traffic information is possible.

Referring to FIG. 7, whether the vehicle is stopping due to a red light may be determined in an uncongested section (S710 and S720). The reason why whether a road is congested and whether the vehicle stops due to a red light are determined is because the driver is likely to accelerate the vehicle upon changing to the green light in a state in which the vehicle stops due to the red light in the uncongested section. In other words, in a congested section, even when the traffic signal is changed to the green light, the requested power as the HEV/EV mode change criterion is unlikely to be generated. Therefore, engine operation delay is difficult and only the SOC and heating performance are decreased.

In a concrete determination method, if the vehicle speed is less than the first threshold for determining whether the vehicle stops and is greater than the second threshold for determining whether a per-section average speed corresponds to a vehicle speed in an uncongested section, it may be determined that the vehicle stops in the uncongested section.

Here, the first threshold and the second threshold may be predetermined and may differently set according to the type and location of the road.

In addition, when the distance to the front traffic signal lamp is less than a third threshold and the red light is currently turned on, it may be determined that the vehicle stops due to the red light.

Upon determining that the vehicle is stopping due to the red light in the uncongested section, the engine operation condition may be set according to the time remaining until the green light is turned on (S730). Specifically, when the time remaining until the green light is turned on is less than a predetermined time, the engine operation condition may be set to the low threshold (S740A), and, otherwise, the engine operation condition is set to the high threshold (S740B). The thresholds are described with reference to FIG. 6 and thus a repeated description thereof will be omitted for clarity of the specification.

The set engine operation condition is compared to the state variable of the vehicle (that is, the current SOC or the current coolant temperature (S750). When the state variable of the vehicle becomes less than the engine operation condition, the engine operates (S760), and, otherwise, the engine does not operate (S770). The "engine does not operate" may mean that the engine operation condition according to the SOC or the coolant temperature is not satisfied. When another engine operation condition (e.g., increase in requested power, etc.) is satisfied, the engine may operate.

In the process described above with reference to FIG. 7, for example, steps S710 and S720 or S710 to S730 may be performed in the AVN system and the other steps may be performed in the hybrid control unit using the result of determination in the AVN system. In addition, the coolant temperature may be acquired from the engine control unit or the FATC.

The hybrid vehicle according to at least one embodiment of the present disclosure can more efficiently control operation of an engine.

In particular, an engine operation time may be controlled using traffic signal information such that the engine efficiently operates at an appropriate time.

The above-described present disclosure may be implemented by computer-readable code in a computer-readable recording medium. The computer-readable recording medium includes all kinds of recording devices in which data readable by a computer system can be stored. Examples of the computer-readable recording medium include a hard disk drive (HDD), a solid state drive (SSD), a silicon disk drive (SDD), a ROM, a RAM, a CD-ROM, a magnetic tape, a floppy disk, an optical data storage device, and so on.

It will be apparent to those skilled in the art that various modifications and variations can be made in the present disclosure without departing from the spirit or scope of the invention. Thus, it is intended that the present disclosure cover the modifications and variations of this invention provided they come within the scope of the appended claims and their equivalents.

What is claimed is:

1. An engine operation control method of a hybrid vehicle, the engine operation control method comprising steps of:
    receiving traffic information including signal information of a front traffic signal lamp;
    determining whether a proceeding-signal change condition is satisfied based on the received signal information upon stopping;
    setting any one of different engine operation conditions according to the result of determination; and
    comparing the set engine operation condition with a current vehicle state to determine whether an engine operates or not,
    wherein the step of determining whether a proceeding-signal change condition is satisfied comprises determining whether a first time remaining until a proceeding signal of the front traffic signal lam is turned on is less than a predetermined second time.

2. The engine operation control method according to claim 1, wherein the step of setting comprises:
    setting a first threshold as the engine operation condition when the first time is equal to or greater than the second time; or
    setting a second threshold less than the first threshold as the engine operation condition when the first time is less than the second time.

3. The engine operation control method according to claim 2,
    wherein the current vehicle state comprises at least one of a state of charge (SOC) of a battery or a coolant temperature based on heating setting, and
    wherein the first threshold and the second threshold are set with respect to each of the SOC and the coolant temperature.

4. The engine operation control method according to claim 1, further comprising steps of:
    determining whether the vehicle stops in an uncongested section; and
    determining whether the vehicle stops due to a stop signal.

5. The engine operation control method according to claim 4, wherein the step of determining whether a proceeding-signal change condition is satisfied is performed when the vehicle stops in the uncongested section due to the stop signal.

6. The engine operation control method according to claim 5, wherein the step of determining whether the vehicle stops in an uncongested section comprises:
    determining a current vehicle speed and a per-section average speed; and
    determining that the vehicle stops in the uncongested section, when the current vehicle speed is less than a first speed and the per-average speed is equal to or greater than a second speed.

7. The engine operation control method according to claim 5, wherein the step of determining whether the vehicle stops due to a stop signal comprises:
    determining a distance to the front traffic signal lamp and a current signal of the front traffic signal lamp; and
    determining that the vehicle stops due to the stop signal, when the distance to the front traffic signal lamp is equal to or less than a predetermined distance and the current signal is a stop signal.

8. The engine operation control method according to claim 1, further comprising a step of operating, by the second controller, the engine when a value corresponding to the current vehicle state is less than the set engine operation condition and, otherwise, not operating the engine.

9. A non-transitory computer-readable recording medium having recorded thereon a program for executing the engine operation control method of the hybrid vehicle according to claim 1.

10. A hybrid vehicle comprising:
    a first controller for receiving traffic information including signal information of a front traffic signal lamp; and
    a second controller for determining whether a proceeding-signal change condition is satisfied based on the received signal information upon stopping, setting any one of different engine operation conditions according to a result of determination whether the proceeding-signal change condition is satisfied, and comparing the set engine operation condition with a current vehicle state to determine whether an engine operates or not,
    wherein the proceeding-signal change condition refers to determining, by the second control, whether a first time remaining until a proceeding signal of the front traffic signal lamp is turned on is less than a predetermined second time.

11. The hybrid vehicle according to claim 10, wherein the second controller sets a first threshold as the engine operation condition when the first time is equal to or greater than the second time, and sets a second threshold less than the first threshold as the engine operation condition when the first time is less than the second time.

12. The hybrid vehicle according to claim 11,
    wherein the current vehicle state comprises at least one of a state of charge (SOC) of a battery and a coolant temperature based on heating setting, and
    wherein the first threshold and the second threshold are set with respect to each of the SOC and the coolant temperature.

13. The hybrid vehicle according to claim 10, wherein the first controller determines whether the vehicle stops in an uncongested section and whether the vehicle stops due to a stop signal.

14. The hybrid vehicle according to claim 13, wherein the second controller determines whether the proceeding-signal change condition is satisfied, when the vehicle stops in the uncongested section due to the stop signal.

15. The hybrid vehicle according to claim 14, wherein the first controller determines that the vehicle stops in the uncongested section, when the current vehicle speed is less than a first speed and a per-average speed is equal to or greater than a second speed.

16. The hybrid vehicle according to claim 14, wherein the first controller determines that the vehicle stops due to the stop signal, when a distance to the front traffic signal lamp is equal to or less than a predetermined distance and a current signal is a stop signal.

17. The hybrid vehicle according to claim 10, wherein the second controller performs control to operate the engine when a value corresponding to the current vehicle state is less than the set engine operation condition and, otherwise, performs control not to operate the engine.

18. The hybrid vehicle according to claim 10,
wherein the first controller comprises an audio/video/navigation (AVN) system, and
wherein the second controller comprises a hybrid control unit (HCU).

* * * * *